(12) United States Patent
Reisinger

(10) Patent No.: US 6,405,487 B1
(45) Date of Patent: *Jun. 18, 2002

(54) DRIVE DEVICE TO MOVE OBJECTS

(76) Inventor: Heinrich Reisinger, Dürerstrasse 19, D-90562, Kalchreuth (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,629
(22) PCT Filed: Aug. 12, 1998
(86) PCT No.: PCT/DE98/02324
§ 371 (c)(1), (2), (4) Date: May 19, 2000
(87) PCT Pub. No.: WO99/09283
PCT Pub. Date: Feb. 25, 1999

(30) Foreign Application Priority Data

Aug. 15, 1997 (DE) .................. 297 14 591 U

(51) Int. Cl.⁷ .................. E05F 11/24
(52) U.S. Cl. .................. 49/340; 248/632
(58) Field of Search .................. 49/360, 339, 340, 49/341; 248/632, 634, 618

(56) References Cited

U.S. PATENT DOCUMENTS

| | | | |
|---|---|---|---|
| 2,945,691 A | 7/1960 | Swift et al. | |
| 3,245,646 A * | 4/1966 | Baratoff | 248/632 X |
| 3,468,061 A | 9/1969 | Ozaki | |
| 4,314,692 A * | 2/1982 | Brauer et al. | 254/362 |
| 4,408,146 A | 10/1983 | Beckerman | |
| 4,658,545 A * | 4/1987 | Ingham et al. | 49/340 |
| 4,727,679 A * | 3/1988 | Kornbizekke et al. | 49/340 X |
| 5,077,938 A | 1/1992 | Moreuil | |
| 5,101,886 A * | 4/1992 | Zacharias et al. | 165/51 |
| 5,366,200 A * | 11/1994 | Scura | 248/632 |
| 5,640,806 A | 6/1997 | Hall | |
| 6,076,795 A * | 6/2000 | Scheidel et al. | 248/603 |
| 6,129,326 A * | 10/2000 | Mandon | 248/632 |

FOREIGN PATENT DOCUMENTS

| | | |
|---|---|---|
| DE | 27 41 538 | 3/1979 |
| DE | 33 40 557 | 5/1985 |
| DE | 36 02 567 | 7/1987 |
| DE | 42 34 873 | 4/1994 |
| FR | 2 627 222 | 8/1989 |

* cited by examiner

Primary Examiner—Jerry Redman
(74) Attorney, Agent, or Firm—Venable; Gabor J. Kelemen

(57) ABSTRACT

A driving arrangement for moving at least one object, which is positioned movably inside a runner rail, in particular a sliding door, a sliding window, or a partitioning wall, comprising an electric motor (1) that drives a traction element (4) by way of a drive pulley (3) that is arranged at one end of the runner rail, which traction element circulates around a reversing device arranged at the other end of the runner rail and moves the object, characterized in that the rotor shaft for the electric motor (1) drives a driven shaft (6) by way of a gear (5). The axis (14) of the driven shaft extends at a right angle to the axis (13) of the rotor shaft and drives the drive pulley (3) by way of a transmission arrangement (9, 10, 11), wherein the gear (5) is positioned such that it can pivot elastically and at a specific angle around the axis (14) of driven shaft (6).

9 Claims, 1 Drawing Sheet

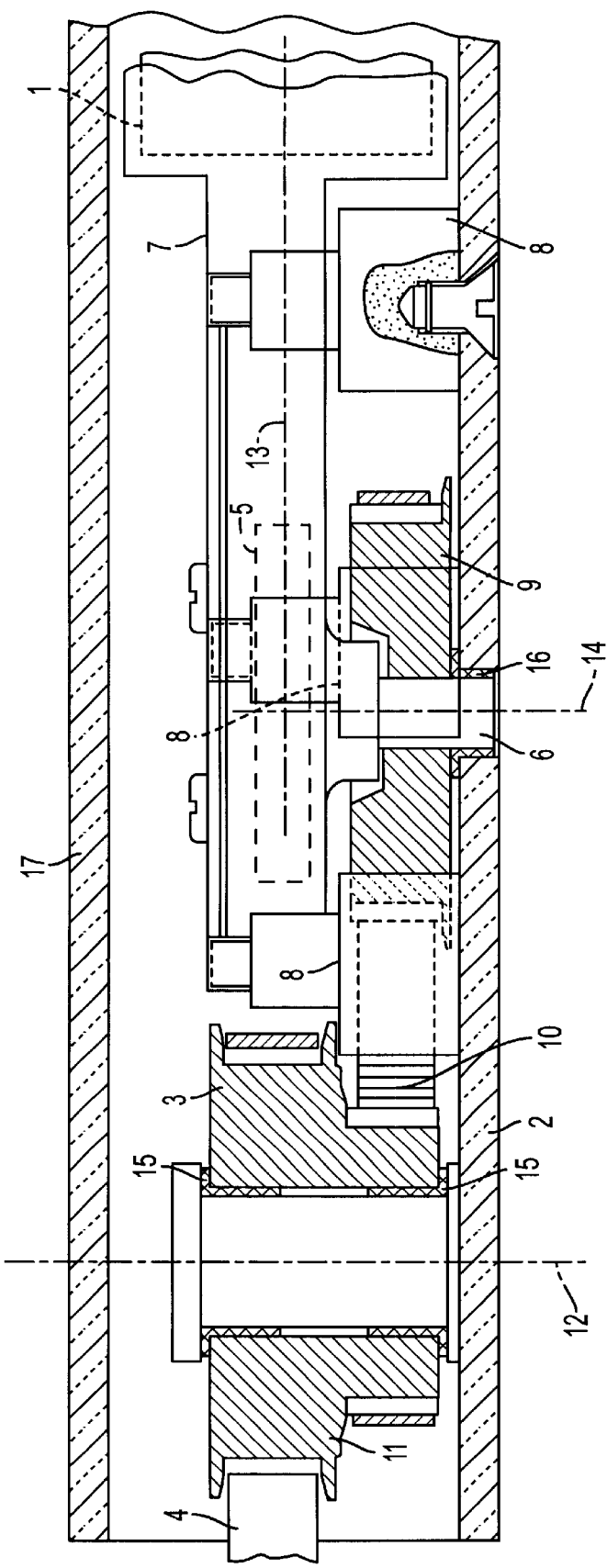
FIGURE

DRIVE DEVICE TO MOVE OBJECTS

The invention relates to a driving arrangement for moving at least one object that is positioned movably inside a runner rail, comprising an electric motor that drives a traction means by way of a drive pulley, arranged at one end of the runner rail, which traction means circulates around a reversing device, arranged at the other end of the runner rail, thereby moving the object, wherein the rotor shaft of the electric motor drives a driven shaft by way of a gear. The driven shaft in turn operates the drive pulley with the aid of a transmission arrangement and its axis extends at a right angle to the axis of the rotor shaft.

A driving arrangement of this type is used, for example, for moving a sliding door, a sliding window, a partitioning wall or the like. The problem here is that the driving arrangement requires a lot of space since the motor and the gear must be designed large enough, so that both can absorb the acceleration forces of the objects to be driven without sustaining damage. For that reason, the driving arrangement cannot be installed at a later date in an existing sliding door frame, for example, unless a recess is provided in the brickwork of the wall accommodating the sliding door or an outward projecting overhang is provided.

German Patent A-27 41 538 discloses a pivoting device for a garage door where the drive unit is positioned on the drive shaft of the traction means drive pulley such that it can pivot and is supported in both pivoting directions such that the moment can be adjusted, wherein electrical switches that shut down the drive motor are activated if a specific pivoting range is exceeded. This is designed to prevent damage to vehicles or injury to persons, which find themselves accidentally in the pivoting range of the opening or closing garage door.

This known arrangement cannot solve the initially mentioned problem with the sliding door drive and also does not provide any hints in this direction.

Furthermore, the reference U.S. Pat. No. 3,468,61 describes an arrangement for a sliding door drive, for which an electric motor with its housing is screwed to a gear housing. The drive unit formed in this way is here elastically suspended at three locations to avoid a transfer of the noise from the running motor and the gear onto the doorframe.

This known arrangement also cannot solve the initially mentioned problem with the sliding door drive and furthermore does not point in that direction, particularly since the size of the motor prevents a subsequent installation into an existing door frame unless a recess is provided in the brickwork for the wall accommodating the sliding door or an outward projecting overhang is provided.

It is the object of the invention to create a driving arrangement of the aforementioned type, which has a simple design, uses less energy as compared to known arrangements, and has considerably smaller dimensions, thus making the installation in a narrow housing, e.g. in the case of a drive for sliding doors, and the subsequent installation in an existing sliding door frame possible without problems.

In order to reduce the acceleration forces of the object to be driven, which act upon the electric motor and the gear, a) the electric motor and the gear with the driven shaft are located inside a joint housing, which is positioned such that it can pivot elastically and at a specific angle around the axis of the driven shaft and b) the electric motor is positioned inside the housing such that it can pivot elastically and at a specific angle around its rotor shaft axis.

The advantages achieved with the invention in particular are that the effect of the high acceleration forces of the objects to be driven, for example the door elements of sliding doors, on the gear and the electric motor are reduced strongly as a result of the damping effect of the elastic bearings for the housing with electric motor and the gear, as well as the electric motor inside the housing. Thus, the electric motor and the gear can be dimensioned considerably smaller. The dimensions can be reduced such that the complete device can be produced at a lower cost, can be housed inside a narrow housing and can be offered as structural module for numerous applications, where all types of objects are to be moved by way of a traction means in two opposing directions. The energy consumption can additionally be reduced considerably as a result of the smaller dimensions of the arrangement.

This narrow housing for the arrangement can, for example, be placed inside a runner rail that accommodates the door elements of a sliding door. A subsequent installation into an existing doorframe is thus possible without problems.

A further advantage is the size of the electric motor, which is dimensioned such that even if the electronic control fails, there is no danger of injury to persons, for example, who are caught accidentally between the closing door panels of a sliding door operated by this electric motor. This is particularly important for hospitals where sliding doors of this type are installed more and more frequently.

The dependent claims list further modifications of the invention as well as their advantages. Thus, for a further improvement of the damping qualities, it is advisable for the housing to rest on buffers in at least three locations, which buffers preferably consist of elastomer or rubber.

In contrast, the housing for another embodiment of the invention is positioned with at least one ball bearing or sliding bearing, such that it can pivot around the axis of the driven shaft and that at least one elastic element, for example a helical spring, a spiral spring or a leaf spring, acts upon the housing and determines the elastic pivoting range of the housing through a corresponding dimensioning.

In order to reduce the transfer of the motor noise to parts outside of the housing, a further modification of the invention provides that the driven shaft drives the drive pulley by way of a transmission arrangement, consisting of a second pulley that is attached to the driven shaft and operates a third pulley by way of a belt, which third pulley is connected to the drive pulley to form one piece. The third pulley together with the drive pulley is positioned so as to rotate around an axis that extends parallel to the axis of the driven shaft, wherein the bearings for the double pulley, consisting of the drive pulley and the third pulley, as well as for the driven pulley are designed to be plastic sliding bearings, made of a plastic with a certain elasticity. In comparison to the otherwise standard ball bearings, these effect a better damping of the structure-born noise.

An additional damping is furthermore achieved in that the traction means and the belt are designed as V-belt or as toothed belt and the respective pulleys as V-belt pulleys or as toothed belt pulleys.

For a further space saving, it is provided that the driven shaft, the transmission arrangement and the drive pulley together are installed in the space adjoining the electric motor in the direction toward the gear. The height of this space is lower than the diameter of the electric motor.

The electric motor should furthermore be a direct current motor operated with low voltage, e.g. 24 V, to permit a quick stopping of the moving objects. The motor can be stopped with the aid of an electrical short or an imprinted countercurrent.

The gear is furthermore designed as non self-locking worm gear or as bevel gear so that the objects can be moved manually if the current fails. As a result, it is possible to forego installing an expensive clutch that must be engaged or disengaged.

For an automatic control of the final shut-down and the stopping of moving objects, it is furthermore provided that an impulse disk for a distance/time measurement, as well as a mechanical or electro-magnetic stopping device be arranged in the region of the transmission arrangement or the gear, in particular a magnetic brake or an electric lifting magnet.

BRIEF DESCRIPTION OF THE DRAWING

The foregoing and other objects, aspects and advantages will be better understood from the following detailed description of a preferred embodiment of the invention with reference to the drawings, in which:

FIG. 1 is a schematic drawing of one embodiment of an electric motor drive assembly in accordance with the teachings of this invention.

The drawing shows one exemplary embodiment of the invention, described in further detail in the following. The single figure shows a partial sectional view from the side of the driving arrangement. This driving arrangement for moving objects (not shown here), in particular sliding doors, sliding windows, partitioning walls or the like, which are positioned movably inside a runner rail (also not shown here), comprises an electric motor 1, preferably a direct current motor operated with a voltage of approximately 24 V. This direct current motor, together with a gear 5 that is driven by its rotor shaft, is housed inside a joint housing 7.

By way of the gear 5, the rotor shaft of the electric motor 1 drives a driven shaft 6, the axis 14 of which extends at a right angle to the axis 13 of the rotor shaft and drives a drive pulley 3 designed as toothed-belt pulley by way of a transmission arrangement 9, 10, 11. A traction means 4, designed as toothed belt, circulates around this drive pulley 3 and also circulates around a reversing device (not shown here) that is arranged at the other end of the runner rail and moves the objects, for example the door elements for a two-panel sliding door or a sliding door with telescopic design, in two opposing directions, for instance in the opening and closing direction.

The joint housing 7 for electric motor 1 and gear 5 is positioned such that it can pivot elastically around the axis 14 of driven shaft 6, for example at an angle of 15°, in order to dampen the acceleration forces that act upon the gear 5 and the electric motor 1 while the movement of the driven objects is started or stopped. Buffers 8 made of elastomer or rubber are therefore used to connect in at least three locations the housing 7 and the base plate 2. This base plate represents a part of a narrow housing, consisting of two side walls and one top 17, and is attached to the runner rail.

The transmission arrangement 9, 10, 11 comprises a second pulley 9 that is fastened to the driven shaft 6 and, by way of a belt 10 that is designed as toothed belt, drives a third pulley 11 that is fixedly connected to the drive pulley 3. This third pulley, together with the drive pulley 3, is positioned such that it can pivot around an axis 12 that extends parallel to the axis 14 of driven shaft 6. The drive pulley 3 and the third pulley 11 form a one-piece double pulley.

Together with the transmission arrangement 9, 10, 11 and the drive pulley 3, the driven shaft 6 is located in the space adjoining the electric motor 1 in the direction toward the gear 5, wherein the height of this space is lower than the diameter of electric motor 1.

Sliding bearings are used as bearings for driven shaft 6 as well as drive pulley 3 and the third pulley 11, or the double pulley formed thereof. These bearings are made in particular of plastic, wherein the plastic has a certain elasticity in order to further dampen the effects of the acceleration forces of the driven objects on the gear 5 or the electric motor 1, as well as to dampen the structure-born noise transmitted to the housing 2, 17.

Thus, the gear 5 is designed as non self-stopping worm gear or bevel gear, so that the objects, for example the sliding doors, can be opened or closed manually in case of a power failure.

This design furthermore ensures that the acceleration and braking forces of the driven or stopped objects can have a retroactive effect on the electric motor. Thus, if a moving object is stopped, for example a door element of a sliding door, because of a person standing in the movement range of the door element, the sudden current increase in the electric motor can be used to trigger a braking operation. For this, the electric motor is electrically short-circuited, for example, or a counter-current is fed in to increase the braking effect, which counter-current can be generated through a simple pole reversal of the electrical connections of the electric motor.

In this way, the expensive electrical limit switches—used for example with sliding doors—which are subject to failures, can be eliminated since the door elements automatically initiate the stopping operation when reaching their respective end positions (open or closed).

What is claimed is:

1. An electric motor drive comprising in combination;

an electric motor (1) with a rotor shaft, said electric motor operating a tractor (4) by way of a drive pulley (3) wherein the rotor shaft of the electric motor (1) drives a driven shaft (6) via a worm gear (5), said driven shaft in turn operates the drive pulley (3) via a transmission arrangement (9, 10, 11), said driven shaft having a rotational axis (14) that extends at a right angle to the axis (13) of the rotor shaft, the electric motor (1), the rotor shaft, and the worm gear (5), driven by the rotor shaft, are installed together in a housing (7), said housing is mounted on elastic members that allow said housing to move in response to an inertial force applied to the worm gear 5 such that said housing elastically moves relative to the axis (14) of the driven shaft (6) in order to reduce the acceleration forces which act upon the electric motor (1) and the worm gear (5).

2. A driving arrangement according to claim 1, characterized in that the housing (7) is supported in at least three locations on elastic buffers (8).

3. A driving arrangement according to claim 1, characterized in that the housing (7) is positioned such that it can move around the axis of the driven shaft (6) with at least one bearing member and at least one elastic element that acts upon the housing (7) and determines the elastic range of movement of the housing (7).

4. A driving arrangement according to claim 1, characterized in that the driven shaft (6) drives the drive pulley (3) via a transmission arrangement (9, 10, 11), which transmission arrangement comprises a pulley (9) that is attached to the driven shaft (6) and operates,by way of a belt (10), a pulley (11), which is connected as one piece with the drive pulley (3), said pulley (11) together with the drive pulley (3)

being positioned such that pulley (11) can pivot around an axis (12) that extends parallel to the axis (14) of driven shaft (6), wherein the bearings (15, 16) for the drive pulley (3) and the pulley (11) are elastic plastic sliding bearings.

5. A driving arrangement according to claim 4, characterized in that the belt (10) is designed as V-belt or as toothed belt and the pulley (9) and the pulley (11) are correspondingly designed as V-belt pulley or as toothed belt pulley.

6. A driving arrangement according to claim 4, characterized in that the driven shaft (6), the transmission arrangement (9, 10, 11) and the drive pulley (3) are installed together in a space adjoining the electric motor (1), the height of which space is lower than the diameter of the electric motor (1).

7. A driving arrangement according to claim 1, characterized in that the traction means (4) is designed as a V-belt, a toothed belt or as traction rope.

8. A driving arrangement according to claim 1, characterized in that the electric motor (1) is a direct-current motor that operates with low voltage.

9. A driving arrangement according to claim 1, characterized in that the gear (5) is a non self-locking worm gear.

* * * * *